United States Patent [19]

Schuetzenduebel et al.

[11] Patent Number: 5,006,322

[45] Date of Patent: Apr. 9, 1991

[54] CONTROLLING POLLUTANTS FROM BOILERS

[75] Inventors: Wolfram G. Schuetzenduebel, Pike Road; James T. Honan, Montgomery, both of Ala.

[73] Assignee: Blount Energy Resource Corp., Montgomery, Ala.

[21] Appl. No.: 283,258

[22] Filed: Dec. 12, 1988

[51] Int. Cl.[5] .................. B01D 53/30; B01D 53/34
[52] U.S. Cl. ................... 423/210; 110/215; 423/240; 423/242; 423/244
[58] Field of Search .......... 423/210, 215.5, 240 R, 423/240 S, 242 R, 242 A, 241 R, 241 A; 110/215

[56] References Cited

U.S. PATENT DOCUMENTS

| | | | |
|---|---|---|---|
| 3,812,793 | 5/1974 | Solomon | 110/8 R |
| 3,907,523 | 9/1975 | Melin, Jr. | 55/73 |
| 3,996,862 | 12/1976 | Besik et al. | 110/10 |
| 4,208,381 | 6/1980 | Isahaya et al. | 423/210 |
| 4,208,383 | 6/1980 | Kisters et al. | 423/242 A |
| 4,245,569 | 1/1981 | Fallon, III | 110/215 |
| 4,279,873 | 7/1981 | Felsvang et al. | 423/242 A |
| 4,302,426 | 11/1981 | Benedick | 422/173 |
| 4,310,498 | 1/1982 | Malki et al. | 423/242 R |
| 4,323,371 | 4/1982 | Ritvanen | 55/19 |
| 4,364,910 | 12/1982 | Willet et al. | 423/242 A |
| 4,444,128 | 4/1984 | Monro | 110/345 |
| 4,487,139 | 12/1984 | Warner | 110/345 |
| 4,533,522 | 8/1985 | Leimkuhler | 422/170 |
| 4,582,122 | 4/1986 | Fan | 165/1 |
| 4,620,492 | 11/1986 | Vogg et al. | 110/345 |
| 4,644,877 | 2/1987 | Barton et al. | 110/250 |
| 4,706,580 | 11/1987 | Lehnert | 110/345 |

Primary Examiner—Jeffrey E. Russel
Attorney, Agent, or Firm—Dann, Dorfman, Herrell and Skillman

[57] ABSTRACT

A method and apparatus for controlling pollution and flue gases from a boiler using municipal solid waste as a fuel. The flue gases pass through internal and external economizers before entering a reactor in which the gases are treated with lime or other reactant in slurry form to neutralize the acid components of the flue gases. The heat of the flue gases dries the products of the reaction and the excess reactants so that they may be separated from the flue gas in subsequent separator, which is a baghouse filter. The feed of the reactant to the reactor is modified in accordance with the concentration of acid constituents in the flue gas, and concurrently the operation of the economizers is modified to raise the temperature of the flue gas exiting the economizers when the feed of reactant is increased and vice versa. The temperature of the flue gas is increased by causing the feed water to bypass the external economizer in direct relation to the quantity of reactant fed to the reactor.

15 Claims, 1 Drawing Sheet

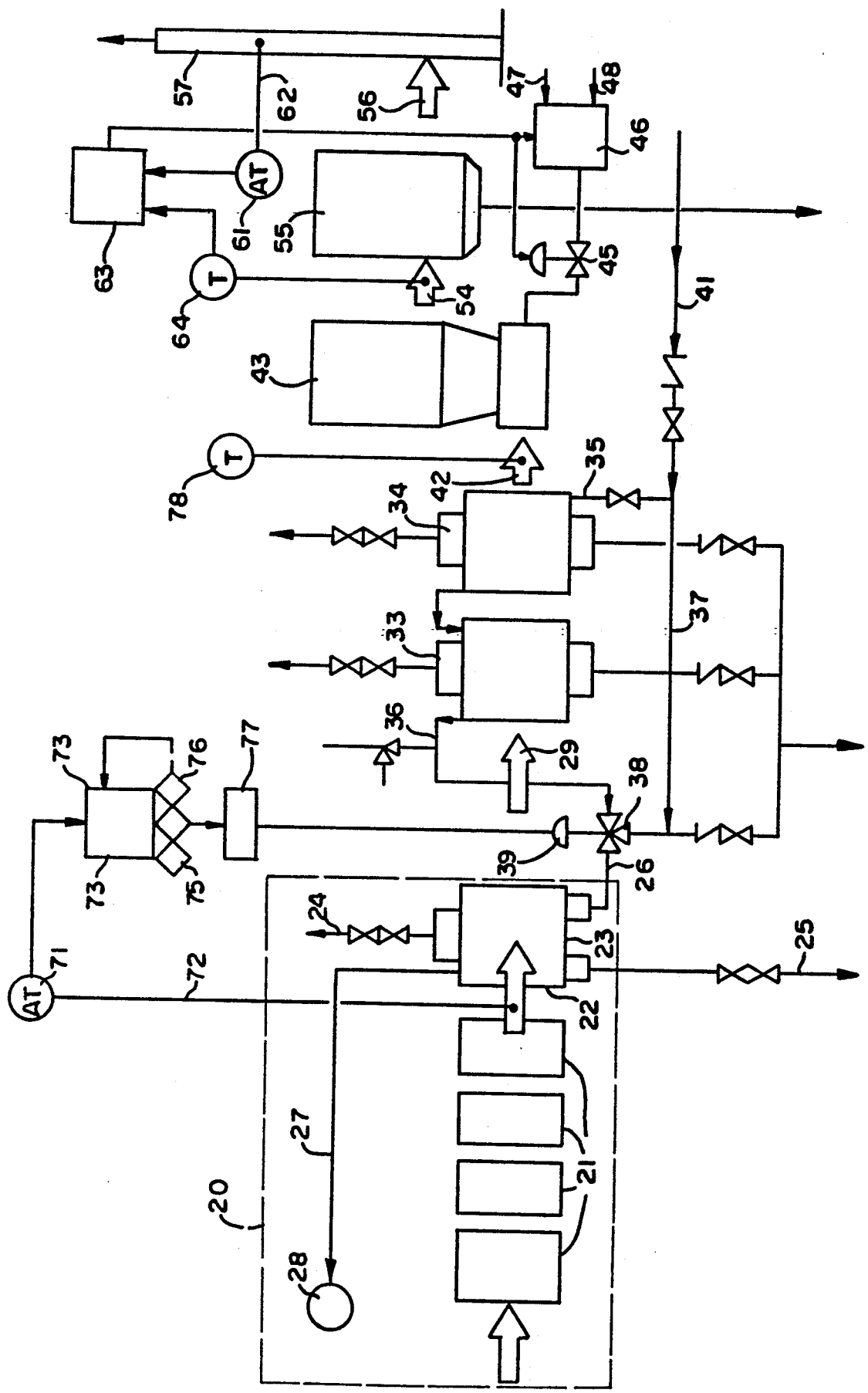

CONTROLLING POLLUTANTS FROM BOILERS

FIELD OF THE INVENTION

The present invention relates to pollution control and more particularly to controlling the operation of the boiler in a trash-to-steam facility to obtain optimum operating efficiency while controlling the pollutants in the effluent of the facility.

BACKGROUND OF THE INVENTION

In conventional boilers, the flue gases are normally treated to maintain the pollutant content of the flue gases exhausted to the atmosphere below the environmental standards of the community. In industrial operation, the characteristics of the operation of the boiler are relatively uniform and the operating parameters of the boiler are established to assure that the pollutant level in the effluent flue gas meets or surpasses the community standard.

For efficient operation, the feed water to the boiler is normally preheated by the exhausted flue gases in order to economize by retrieval of the heat energy in the flue gases before they are discharged through the stack. There is a critical stack temperature which must be maintained for efficient operation. The stack temperature is normally about the saturation temperature or acid dew point temperature of the flue gas, typically below 270° F. (130° C.).

Preferably, the feed water in one or more economizers or heat exchangers reduces the temperature of the flue gases preferably close to their saturation temperature before they are discharged.

The acid content of the flue gases is reduced by directing the gases to a scrubber or other apparatus which serves as a reactor in which a lime slurry or other reactant in a liquid carrier is introduced into the gas stream to remove the acid pollutants in the flue gas. In the reactor, the gas flow evaporates the moisture from the slurry as the reactant reacts with the acid pollutants, is dried and is separated out of the gas flow. Any residual reactant which is not separated out of the gas flow is entrained in the gas flow which carries the entrained material to a separator which separates out the particulate material from the gases. A typical separator consists of a baghouse filter in which fabric bags serve as the filter medium in which the effluent gas is caused to flow through the bags and deposit the entrained material on the bag surface. In order to avoid premature blockage of the bag surfaces, the entrained material should be free from moisture so as to avoid caking of the material on the bag surfaces.

When burning standard fuels, the boiler, the economizers, the reactor and the filter may be set to accommodate their operation to the particular characteristics of the fuel and the effluent generated in the boiler by the fuel. For example, in the reactor, the composition of the slurry is selected to assure a stochiometric ratio above 1.0 between the reactant and the acid components of the particular flue gas, and to assure the proper quantity of liquid carrier to afford complete evaporation of the carrier by the flue gas which should be discharged at the desired stack temperature. During start-up and shutdown, the boiler conditions depart from the optimum and there is a substantial loss in efficiency, but such losses are tolerated because of the infrequency of their occurrence.

When burning municipal solid waste in a boiler, however, the composition of the fuel may vary considerably with the source of the waste material being burned, and the efficiency of the facility may be substantially less than the maximum in order to accommodate the variations in the characteristics of the material which is burned in the boiler. For example, pollutant concentration in the flue gas at the boiler may be as high as 250 ppm $SO_2$, 500 ppm HCl and 50 ppm HF. 80% to 90% of these pollutants must be removed to meet community standards.

SUMMARY OF THE INVENTION

The present invention provides a novel control for a boiler which accommodates to a wide variation in the fuel used to fire the boiler without sacrificing efficiency in the operation of the boiler.

More specifically, the present invention provides a control for a pollution control system in a boiler which permits the operation of the reactor used for removing pollutants from the flue gas under conditions which vary with the characteristics of the fuel being used to fire the boiler.

More specifically, the present invention provides means for controlling the acid content of the pollutants in the flue gas exiting the system. The system moderates the reactor to accommodate variations in the acid content, namely by varying the quantity of lime or other basic reactant used in the reactor, and concurrently the temperatures of the flue gas being treated in the system are controlled to assure optimum efficiencY in the operation of the system.

In the illustrative example of the present invention, the acid content of the flue gas in advance of the reactor is determined. When the acid content changes, the quantity flow rate of lime to the reactor is modified in accordance with such acid content by providing a higher concentration of lime in the slurry when the acid content rises or by providing a higher feed rate for the slurry. Concurrently with the increased quantity flow rate of lime to the reactor, the temperature of the flue gas entering the reactor is elevated to assure complete drying of the particles in the lime slurry entrained in the gas flow exiting the reactor to facilitate removal of the dried particles by the bag filter.

BRIEF DESCRIPTION OF THE DRAWING

All of the objects of the invention are more fully set forth hereinafter with reference to the accompanying drawing, wherein:

The Figure is a diagrammatic representation of a facility for burning solid municipal waste in a boiler.

DESCRIPTION OF A PREFERRED EMBODIMENT

Municipal solid waste burning is effected in an incinerator or boiler having a boiler heating surface cooperating with a steam drum for generating steam. The boiler includes evaporators and superheaters shown in the drawing at 21 and the flue gas indicated by the arrow 22 is caused to flow through a heat exchanger 23 which serves as an internal or first economizer. The heat exchanger 23 has a relief vent 24 and drain 25 and is fed with feed water at 26 which is discharged at 27 into the steam drum 28. The economizer 23 conserves energy by recovering heat from the flue gas 22 prior to its being discharged from the boiler 20, and using the recovered heat to preheat the feed water to the steam drum.

The discharged flue gas at 29 is directed through a second economizer, in the present instance a pair of external economizers 33 and 34 which are connected in series countercurrent to the flow of flue gas therethrough. As an alternative, the second economizer may be a single unit or may be more than two units. Feed water is fed into the series of heat exchangers as indicated at 35 and is discharged at 36. In accordance with the invention, a bypass line is provided around the economizers 33 as indicated at 37, extending from the feed line 35 and joining the discharge line 36 at a pneumatic proportioning valve 38 having an operator 39 controlled as described hereinafter. The inlet 35 and bypass 37 are fed from a feed water supply line 41.

The fresh feed water from the supply 41, which passes through the second economizer, serves to further cool the flue gases and to raise the temperature of the feed water by heat exchange, to thereby improve the efficiency of the boiler 20. The cooled flue gas exiting the external economizers at 42 is fed into a reactor 43 in which the flue gas is treated with a reactant such as lime or other sorbent to reduce the acid content of the flue gas to acceptable levels established by the community standards. The reactant is fed into the reactor 43 through a valve 45 from a blender 46 which forms a slurry from the reactant, such as lime, fed into the blender from a supply 47 and a liquid carrier, such as water, fed from a supply 48. The feed rate and the blend of reactant and carrier are controlled to establish a quantity flow of reactant into the reactor 43 sufficient to reduce the acid pollutants in the flue gas entering the reactor at 42. The quantity of reactant is controlled to provide a stoichiometric ratio greater than 1.0 relative to the content of the acid pollutants in the flue gas.

In the reactor 43, the flue gas comes into contact with the slurry produced by the mixer 46, for example by a spray dryer effect, so that the gas is exposed to the reactant in its liquid carrier. The acid pollutants react with the sorbent, and the heat of the flue gas evaporates the liquid carrier so that the products of the reaction and the excess reactants are dried and entrained in the flow through the reactor 43. The flue gas with the entrained pollutants at 54 is introduced into a separator 55, such as a bag filter * which removes the entrained particulate matter from the flue gas and discharges the particulate-free gas at 56 into the stack 57, for example with the aid of a blower (not shown).

The feed of the slurry into the reactor may be controlled by determining the acid content of the flue gas in the stack, and also by sensing the temperature of the flue gas exiting the reactor 43. To this end, an analyzer transmitter 61 is connected to a probe 62 in the stack 57 so as to transmit a signal to a controller 63 which also receives a signal from a thermostat 64 responsive to the temperature of the flue gas at 54. When the acid content of the flue gas increases towards the limit determined by the community standard, the quantity of the reactant fed to the scrubber or other reactor 43 is increased. Similarly, if the exit temperature of the flue gas at 54 increases above the optimum level, the quantity of liquid carrier fed into the scrubber may be increased to effect a greater temperature reduction in the scrubber by greater evaporation. In this way, the acid content of the flue gas discharged through the stack is maintained within the community standard and the efficiency of the scrubber is maintained at an optimum level to assure complete drying of the flue gas in the reactor 43 with an excess of reactant being provided which may be deposited on the filter elements through which the flue gas flows in the separator 55. The excess reactants deposited on or in the filter elements in the separator 55 provide a bed of reactant which the flue gas contacts in its flow through the separator to thereby further reduce the acid levels in the flue gas, particularly accommodating any peaks of acid content in the flue gas.

Where the fuel to the boiler is of relatively uniform composition, the operating parameters of the system may be let to operate at peak efficiency. Preferably, the exit temperature in the flue should be in the range of 240° F.–280° F., or 115° C.–135° C. This temperature is above the acid dew point of the flue gas. Where the fuel for the boiler is relatively uniform, the controls in the controller 63 may be operated manually or empirically in response to observation of the analysis of the flue gas and the exit temperature from the scrubber.

In accordance with the present invention, means is provided to obtain efficient operation of the system when the fuel for the boiler is non-uniform, for example in municipal solid waste installations where there is a wide variation in the source of the waste material to be burned, and, thus, a wide variation in the composition of the fuel, maximum economy and operation may not be achieved by simply controlling the feed of reactant to the scrubber or other reactor. It has been found that when the acid content requires a substantial increase in the quantity flow of reactant, the heat in the flue gas introduced into the scrubber may not be sufficient to completely evaporate the liquid carrier and the residual particulate material entrained in the flue exiting the reactor contains sufficient liquid content to be moist and to cake on the separator, thereby substantially reducing its efficiency and possibly even blocking the flow through the separator. To obtain complete drying of the reactant, a temperature differential through the reactor of 50° F. or 28° C. is sufficient under normal conditions. However, it may be necessary to increase the differential to as much as 130° F. or 72° C. if the quantity flow of the reactant is doubled. Previously, it has been proposed to overcome this problem by reheating the flue gas so that the moist reactant is dried prior to entering the separator. Such practice reduces the efficiency of the system.

The present invention permits efficient operation of the system and of the reactor in particular, by changing the operation of the economizers to reduce the cooling effect of the economizers when it is found necessary to achieve a greater drying effect in the reactor. Thus, by allowing the temperature of the flue gas entering the reactor to remain at an elevated level, complete evaporation of th liquid carrier in the reactor may be achieved, the evaporation in the reactor thereby reducing the flue gas temperature in the reactor so as to maintain an efficient exit temperature from the reactor. The control of the temperature of the flue gas entering the reactor at 42 is preferably accomplished by manipulation of the proportioning valve 38. By increasing the proportion of the feed water flowing through the bypass 37, and reducing the portion flowing through the second economizer, the temperature of the flue gas is allowed to remain at a higher level than would be case where the entire flow is directed through the second economizer.

The proportioning valve is designed to permit the entire flow of feed water to flow through the second economizer at one end of its adjustment, but to assure a minimal flow through the second economizer at the other end of the adjustment range, i.e., when the maximum flow is through the bypass 37. In this way, the minimal flow through the economizers avoids problems which might arise if the tubes in the second economizer become dry without flow of water therethrough. Adjusting the proportioning valve 38 enables the temperature of the flue gas at 42 to be varied between approximately 320° F. and 450° F., or approximately 160° C. and 230° C..

It is preferred to control the proportioning valve 38 independently of the controller 63 by sensing the acid content of the flue gas gas upstream of the reactor. In the present instance, the flue gas is sampled within the boiler 20 by an analyzer transmitter 71 having a probe 72 sampling the flue gas at 22. The transmitter sends a signal to a controller 73 which is controlled manually at 75 or is automatically compared with a set point reference at 76 to create a signal for a converter 77 which provides a pneumatic signal to the valve control 39. A thermostat may be provided at 78 to display the output temperature of the flue gas exiting the economizers at 42. Thus, when the acid content of the flue gas in the boiler a 22 increases, the controller 73 reduces the flow through the external economizers 33 and 34 to increase the temperature indicated at 78. In the drawing, the analyzer transmitter 71 uses $SO_2$ concentration as the index of acid gas concentration. The analyzer determines the $SO_2$ concentration and generates a signal which is compared to the $SO_2$ set point in the controller 73 to provide a signal to the converter 77 which, in turn, causes the proportioning valve 38 to be adjusted to increase the flow through the bypass. The control loop may be calibrated so that there is a fixed relationship between the sensed $SO_2$ concentration and the temperature displayed at 78. For example, the relationships may be, as follows:

| Acid Content at 22 (ppm of $SO_2$) Approximate Outlet Temperature at 42 | 250 | 300 | 350 | 400 | 450 | 500 |
| --- | --- | --- | --- | --- | --- | --- |
| (°F.) | 320 | 334 | 348 | 362 | 376 | 390 |
| (°C.) | 160 | 168 | 175 | 183 | 192 | 200 |

The above values may be modified in the controller to reflect actual operating conditions in the system, such as the gross effects upon the economizers tubes of various concentrations of acid gas at various temperatures, and such variations need not be linear. Particularly when handling municipal waste, the heat exchange surface in the boiler and the economizer become fouled, and when this occurs, the heat-exchange efficiency drops, leading to higher-than-normal temperatures in the flue gas throughout the system. This, in turn, reduces the system efficiency. The present invention allows empirical correction of the temperature levels by simply adjusting the controller settings. If desired, the operation of the controller 63 may be modified by a signal fed forward directly from the transmitter 71 or the controller 73.

The flow of water through the economizers is changed inversely with the acid content of the flue gas sensed by the transmitter 71, resulting in a direct change in the output temperature at 42 relative to the acid concentration at 22. It has been found that measuring $SO_2$ content is effective to control the acid content of the flue gas in the stack so that the reactant necessary to neutralize the $SO_2$ content is more than adequate to neutralize other constituents that may be present. Alternatively, instrumentation may be provided to measure the acid dew point of the flue gas or the $SO_3$ content. Similarly, if the municipal waste contains a constituent which is dominant, the concentration of that constituent may be monitored to control the system.

If desired, more precise control of the flue gas stack temperature may be achieved by a controller at 73 using a cascade loop input responsive to the gas temperature at 42, or the water temperature at 35, or the water temperature at 48.

The effect of controlling the bypass in response to changes in the acid content of the flue gas in advance of the scrubber or other reactor is to modulate the entrance temperature to the scrubber which enables the reactor controls for the slurry to be focused upon the quantity flow of reactant, and minimizes the need for adjusting the flow of the liquid carrier for the reactant. Thus, the illustrated system simultaneously changes the flow rate of the reactant and the operation of the economizers to achieve a uniform output from the reactor which is within the community standards as to acid content, and yet does not upset the optimum efficient operation of the system.

During start-up and shut-down, the operating characteristics of the system are not in steady state condition, and it is therefore desirable to maintain the flue gas temperature at 42 at the high end of its operating range. For this purpose, an override is incorporated into the controller 73 to bypass the second economizer during start-up and shut-down. In this way, it is assured that the flue gas remains above the acid dew point in its flow through the economizers.

The illustrated system provides efficient and effective operation of a boiler using municipal solid waste as its fuel. The particular apparatus used in various installations may differ substantially from what is shown diagrammatically in the drawing and it is understood that the manufacturers of the equipment may recommend alternative locations for the sensor probes and alternative arrangements in the economizers to achieve the desired results. The drawing is considered illustrative and changes and modifications may be made therein and thereto within the scope of the following claims.

We claim:
1. A method of controlling the emissions in the flue gas of the boiler in a municipal solid waste burning system having first and second economizers for both heating feed water for the boiler and cooling the flue gas from said boiler, a reactor through which said cooled flue gas flows, said reactor having means to introduce a basic reactant at a selected quantity flow rate in slurry form to reduce the acid content of the cooled flue gas, and a separator to separate particulates form said flue gas prior to discharging the flue gas, comprising the steps of:
  determining the acid content of the flue gas in advance of said reactor,
  changing the quantity flow rate of reactant in response to a change in the determined acid content to provide a quantity of reactant sufficient to reduce the acid content of the discharged flue gas below a given concentration; and
  concurrently with changing the quantity flow rate of said reactant, changing the operations of said first and second economizers to effect an inverse change in the cooling of the flue as whereby the temperature of the flue gas entering the reactor is changed directly with the change in quantity flow rate of reactant introduced into said reactor.

2. A method according to claim 1 wherein said first and second economizers are connected in series with the first economizer downstream from the second economizer in relation to the flow of feed water therethrough, including the steps of directing all of said fred water through said first economizer, and controlling the temperature of said flue gas entering the reactor by directing a smaller or larger portion of said feed water through said second economizer.

3. A method according to claim 2 wherein said step of controlling the temperature of the flue gas entering the reactor is effected by providing a bypass around said second economizer and proportioning the flow of feed water between one path through said second economizer and a second path bypassing said second economizer.

4. A method according to claim 3 including the step of limiting said step of proportioning the flow so as to contintually provide at least a minimal flow of feed water through said second economizer.

5. A method according to claim 1 including the step of providing an overriding control to minimize cooling of the flue gases during start-up and shut-down of the boiler to thereby cause the flue gas to remain above the acid dew point temperature in its flow through said first and second economizers.

6. A method according to claim 1 wherein said separator includes a filter medium through which said flue gas is passed including the steps of:
controlling the quantity flow rate of reactant into said reactor to provide a stoichiometric ratio greater than 1.0, thereby providing an excess reactant, said excess reactant being dried by evaporation of the slurry to form reactant particulates;
collecting the reactant particulates from said flue gas on said filter medium so as to provide an accumulation of reactant particulates for reacting with any acid content of said discharged flue gas.

7. A method according to claim 1 wherein the step of changing the quantity flow rate of reactant includes the step of:
sensing the acid content of the flue gas downstream of said reactor;
sensing the temperature of the flue gas downstream of the reactor; and
controlling the quantity flow rate of reactant to maintain the acid content below a selected level and to maintain the sensed temperature approximately at a selected level.

8. A method according to claim 7 including the steps of:
forming said slurry by mixing said reactant with a liquid carrier before introducing the slurry into said reactor; and
controlling the quantity of liquid carrier in said slurry to maintain the temperature of the flue gas downstream of the reactor approximately within a selected temperature range.

9. A method according to claim 8 wherein said reactant is lime and said liquid carrier is water and said selected temperature range is between 240° F. and 280° F.

10. A method according to claim 9 wherein the temperature of the flue gas entering the reactor is changed within the range of 320° F. and 450° F.

11. A method of controlling the emissions in the flue gas of a municipal solid waste boiler having economizers for both heating feed water for the boiler and cooling the flue gas from said boiler, a reactor through which said cooled flue gas flows and from which the flue gas is discharged, said reactor having means to introduce a basic reactant and a liquid carrier at a selected quantity flow rate in slurry form to reduce the acid content of the cooled flue gas, said cooled flue gas evaporating said liquid carrier to further reduce the temperature of the flue gas discharged form said reactor and produce aired reactant particulates in said flue gas, and a separator to separate particulates from said flue gas prior to discharging the gas to atmosphere, comprising the steps of:
determining the acid content of the flue gas;
determining the temperature of the discharged flue gas;
changing the quantity flow rat of reactant directly in response to a change in the determined acid content to provide a quantity of reactant sufficient to maintain the acid content of the discharged flue gas below a given concentration;
changing the quantity flow rate of the slurry to maintain the determined temperature approximately constant; and
concurrently with changing the quantity flow rates of reactant and slurry, changing the operations of said economizers to effect an inverse change in the cooling of the flue gas whereby the temperature of the flue gas entering the reactor is changed directly with the change in the quantity flow rate of the slurry introduced into said reactor to enable evaporation of said liquid carrier within said reactor.

12. A method according to claim 11 wherein said separator includes a fillet medium through which said gas discharged from said rector is passed including the steps of:
controlling the quantity flow of reactant into said reactor to provide a stoichiometric ratio greater than 1.0, thereby providing an excess reactant, said excess reactant being dried by evaporation of the slurry to form reactant particulates;
collecting the reactant particulars from said flue gas in said filter medium so as to provide an accumulation of reactant particulates for reacting with any acid content of said discharged flue gas.

13. A method according to claim 11 including the steps of:
forming said slurry by mixing said reactant with the liquid carrier before introducing the slurry into said reactor; and
controlling the quantity of liquid carrier in said slurry to maintain the temperature of the discharged flue gas approximately within a selected temperature range.

14. A method according to claim 13 wherein said reactant is lime and said liquid carrier is water and said selected temperature range is between 240° F. and 280° F.

15. A method according to claim 14 wherein the temperature of the flue gas entering the reactor is changed within the range of 320 F. and 450° F.

* * * * *

UNITED STATES PATENT AND TRADEMARK OFFICE
CERTIFICATE OF CORRECTION

PATENT NO. : 5,006,322

DATED : April 9, 1991

INVENTOR(S) : Wolfram G. Schuetzenduebel; James T. Honan

It is certified that error appears in the above-identified patent and that said Letters Patent is hereby corrected as shown below:

Column 4, line 54, "th" should be --the--;

Column 5, line 25, "a" should be --at--;

Column 7, line 2, "as" should be --gas--;

Column 7, line 10, "fred" should be --feed--;

Column 8, line 15, "aired" should be --dried--;

Column 8, line 22, "rat" should be --rate--;

Column 8, line 39, "fillet" should be --filter--;

Column 8, line 47, "particulars" should be --particulates--.

Signed and Sealed this

Eleventh Day of August, 1992

*Attest:*

DOUGLAS B. COMER

*Attesting Officer*  *Acting Commissioner of Patents and Trademarks*